(12) United States Patent
Way et al.

(10) Patent No.: US 6,276,700 B1
(45) Date of Patent: Aug. 21, 2001

(54) GRAVITY DRIVEN STEERABLE WHEELED VEHICLE

(76) Inventors: Frederic Latimer Way, 720 Gilead St., Hebron, CT (US) 06248; Steven Kendall Walton, 315 Deer Ridge Rd., Townshend, VT (US) 05353; David Newton, 67 Ridgewood Ave., Keene, NH (US) 03431

(*) Notice: Subject to any disclaimer, the term of this patent is extended or adjusted under 35 U.S.C. 154(b) by 0 days.

(21) Appl. No.: 09/071,523

(22) Filed: May 1, 1998

Related U.S. Application Data

(60) Provisional application No. 60/045,490, filed on May 2, 1997.

(51) Int. Cl.[7] .................................................. B62B 11/00
(52) U.S. Cl. ................................... 280/87.01; 280/267
(58) Field of Search ........................ 280/21.1, 22, 28.11, 280/28.14, 28.15, 28.16, 87.01, 87.021, 87.03, 87.042, 84.043, 87.05, 263, 267, 269, 400; D21/71, 81; D12/6; 180/6.32

(56) References Cited

U.S. PATENT DOCUMENTS

| | | | |
|---|---|---|---|
| 885,977 | * 4/1908 | Brown | 280/263 |
| 967,423 | * 8/1910 | Orcutt | 280/87.01 |
| 1,431,826 | * 10/1922 | Lovett | 280/21.1 |
| 1,722,574 | * 7/1929 | Hood | 280/87.01 |
| 1,938,701 | * 12/1933 | Jones et al. | 280/8 |
| 2,001,647 | * 5/1935 | Alt | 280/263 |
| 2,043,374 | * 6/1936 | Gelbman | 280/8 |
| 2,103,998 | * 12/1937 | Birkhead | 280/88 |
| 2,141,509 | * 12/1938 | Brody | 280/87.01 |
| 2,738,542 | * 3/1956 | Clark, Jr. | 16/44 |
| 2,750,198 | * 6/1956 | Moore et al. | 280/7.14 |
| 2,965,387 | * 12/1960 | Brunzell | 280/87.01 |
| 3,035,849 | * 5/1962 | Broth | 280/87.01 |
| 3,069,182 | * 12/1962 | Hufford | 280/267 |
| 3,345,080 | * 10/1967 | Schneiderman | 280/87.01 |
| 3,391,947 | * 7/1968 | Hodas | 280/87.03 |
| 3,704,897 | * 12/1972 | Bagge et al. | 280/91 |
| 3,862,766 | * 1/1975 | Bogdanovich | 280/16 |
| 3,870,334 | * 3/1975 | Cole | 280/87.01 |
| 4,076,266 | * 2/1978 | Krausz | 280/87.04 |
| 4,098,519 | * 7/1978 | Reid, Jr. | 280/87.01 |
| 4,134,599 | * 1/1979 | DiMille et al. | 280/87.01 |
| 4,295,547 | * 10/1981 | Dungan | 188/2 R |
| 5,573,257 | * 11/1996 | Olivieri | 280/22 |
| 5,868,408 | * 2/1999 | Miller | 280/87.042 |
| 5,927,732 | * 7/1999 | Snyder | 280/87.01 |
| 5,997,018 | * 12/1999 | Lee | 280/87.042 |

\* cited by examiner

*Primary Examiner*—Brian L. Johnson
*Assistant Examiner*—Bridget Avery
(74) *Attorney, Agent, or Firm*—George W. Dishong

(57) ABSTRACT

A gravity driven steerable wheeled vehicle for recreational use, most particularly on surfaces such as pavement, artificial hard-pack turf, mountain slopes, dirt roads, grass and hard-packed snow. The vehicle has at least three (3) but preferably four (4) wheels which may or may not be on independent axles one from the other and which may or may not be each independently shock suspended. There is also a steering mechanism for steering the vehicle and a driver compartment portion for containing a driver of the vehicle in a prone face-down and face-forward position. The vehicle is steerable by the driver from the prone face-down and face-forward position. The vehicle may further have braking system for slowing or stopping the vehicle and a harness apparatus for harnessing the driver onto and into the vehicle.

27 Claims, 10 Drawing Sheets

GRAVITY DRIVEN STEERABLE WHEELED VEHICLE

CROSS-REFERENCE TO RELATED APPLICATIONS

This application claims the benefit of Provisional Application Ser. No. 60/045,490 filed on May 02, 1997, entitled GRAVITY DRIVEN STEERABLE WHEELED VEHICLE.

STATEMENT REGARDING REDERALLY SPONSORED RESEARCH OR DEVELOPMENT

Not Applicable.

BACKGROUND OF THE INVENTION

1. Field of the Invention

This invention most generally relates to gravity driven vehicles such as downhill racing carts. More particularly this invention relates to maneuverable, steerable gravity driven vehicles. Most particularly, the invention relates to a stable, durable gravity driven vehicle which is steerable, has at least two wheels and at least one brake, is ridden in a prone, face down, face forward position and which may be ridden on varied surface terrain such as dirt, grass or snow.

2. Description of Related Art

Although there are various patents disclosing embodiments for devices which permit movement over a surface, the following patents known to the inventors hereof, do not in any manner suggest or teach the Gravity Driven Steerable Wheeled Vehicle disclosed and claimed by applicants in the instant application for patent.

U.S. Pat. No. 3,887.210 to Funke discloses a four-wheeled, downhill racing cart with a steel frame and a driver's seat mounted on the frame for use on various surfaces. The rider of the cart must sit in an upright position with feet forward. The cart is steered by applying pressure with the feet to pedals attached to the front axle assembly. There is a braking mechanism which is triggered s by leaning forward in the seat and engaging a braking member which is suspended from the seat frame. When the seat is leaned forward and the braking member is engaged, a plate is lowered to contact the ground surface and apply braking by frictionous contact with the ground. A rubber pad is fastened to the underside of the braking plate for braking engagement with the surface over which the cart is traveling. The cart does have handle bars, however, they are not used at all for steering control of the vehicle. The handles appear to be used for holding on and keeping the rider with the cart. The device also has carry hooks on the front handle assembly for towing of the device to the starting area. Additionally, the device can be fitted with a "roll-bar" attachment.

U.S. Pat. No. 4,098.519 to Reid, Jr. device looks most like the known "flexible flyer" type of snow sled. This wheeled sled has four wheels and may be ridden on a variety of surfaces in a sitting or prone position. The body of the device is not inclined and is composed of several, separate, wooden slats. There are slots in the body of the device for gripping when riding in a seated position. However, the prone position would be preferred in order for the user to operate the two hand brakes installed on the handle bars at the front of the device. The device is steered by way of crossed steering bars pivoted to each of the rear axle brace, front axle brace, and steering handle. The steering bars are connected diagonally to opposite positions on the front and rear axles such that the axle braces are pivoted in opposite directions as the steering handle is moved—this minimizes turning radius. Springs return the steering handle to a neutral, centered position when there is no pressure on the steering handle. The hand brakes act on the front wheels. This device does not have any sort of tow hook for pulling the sled to a starting position. There is no restraining device or harness on this, or any of the previously-described sleds. There is also no "roll-bar" or any sort of plate or device to prevent injury or to keep the sled from tipping over.

U.S. Pat. No. Des. 331,031 to Janoff discloses a design for a land sled. Design patents cover only the look of the device depicted in the Figures and no real description of the device is included in a design patent. This particular land sled differs from the two previously described devices in several ways. It has two large roller-type wheels, instead of four smaller wheels. It is capable of being steered by either the hands or feet and can be ridden sitting in an upright position (steering with the feet) or in a prone position (steering with the hands). The steering appears to be accomplished in a way similar to that of known "flexible flyer"—type snow sleds—by pushing and/or pulling the large handle bar extending across the front of the device. There are also slots along the side of the sled, towards the back, for gripping when using the sled from a seated position. There does not appear to be any sort of incline to the main body of the sled, on which one would sit or lay prone, although it is difficult to determine much about the mechanics of a device from a design patent.

U.S. Pat. No. 5,354,081 to Huffinan et. al., discloses a stunt-riding toy for use on a variety of surfaces including snow. The device may be fitted with four wheels, or skis. This vehicle has a seat and also must be operated from a sitting position, with the feet placed on plates near the front of the device. The device is quite narrow and is steered mainly by leaning in the direction it is desired to turn. The front foot plates also serve as a brake and a means to keep the vehicle from leaning too far and tipping over. If the vehicle leans too far, the plates will contact the ground surface, apply braking pressure and prevent further tipping. The device has two handles and a rear hand cable brake which pulls a plate into contact with the wheels when the hand brake is engaged. The handles are positioned near the rear of the device, close to the seat so that the rider's arms hang down along the rider's side to grip the handles, and keep the rider in an upright position.

The invention has the particular objectives, features and advantages of. 1) a steerable gravity driven vehicle, 2) that such vehicle is ridden in a prone, face forward position, 3) that such vehicle has at least one brake, 4) that such vehicle has a plurality of wheels, most preferably four (4) wheels however the sled having three (3) wheels—the single wheel preferably located between the legs of the driver—is also disclosed and is within the scope of the disclosure of the invention.

The patents noted herein provide considerable information regarding the developments that have taken place in this field of non-motorized vehicle technology. Clearly the instant invention provides many advantages over the prior art inventions noted above. Again, it is noted that none of the prior art meets the objects of the gravity driven vehicle in a manner like that of the instant invention. None of them is as effective and as efficient as the instant Gravity Driven Steerable Wheeled Vehicle for maneuvering down steep, varied surface terrain and none of them are operated from the prone face down and face forward position.

The most fundamental objects and advantages of the invention are: 1) a steerable gravity driven vehicle, 2) that such vehicle is ridden in a prone, face down, face forward position, 3) that such vehicle has at least one brake, 4) that such vehicle has wheels, although not necessarily limited to four wheels.

There could be three (3) wheels on the vehicle, with the third wheel being located either at the front or the rear of the vehicle. The third wheel may be the same size as the other two wheels, or may be large or smaller. The third wheel may be independently steerable, or steerable in cooperation with the steering of the other two wheels.

The vehicle may have independent mechanical, air actuated or hydraulic actuated brakes and may have independent hydraulic shock absorbers on some or all wheels. But the vehicle need not have shock absorbers at all, or may have shock absorption only for the front wheels, for example. The vehicle also may have an attachment for the picking up of the vehicle by, for example, a ski chair lift, and which may be a part of the driver/operator restraint system acting to keep the operator's legs from drifting off of the vehicle especially in a sharp turn maneuver. The attachment for picking up the vehicle may further serve to protect the rider should the vehicle roll over. However, this attachment is not fundamental to the invention.

A primary object of the invention is to provide a gravity driven steerable wheeled vehicle comprising a chassis and a riding surface on which a rider is oriented in a prone, face down, face forward position, at least three wheels, means for steering the vehicle, means for causing deceleration or halting of motion of the vehicle, an d means for harnessing the rider onto and into the vehicle.

Another primary object of the invention is to provide means for steering each wheel independently.

A further primary object of the invention is to provide means for absorbing shock exerted on said wheels by the vehicle passing over rough terrain.

Another object of the invention is to provide means for towing the vehicle to the top of an incline, and means for assisting the rider in staying on the vehicle and protecting the rider if the vehicle were to roll over.

Yet another object of the invention is to provide such a vehicle further comprising four wheels.

Another object of the invention is to provide such a vehicle having three wheels.

A still further object is to provide a safety brake which actuates upon release of the hand grips for operation and parking safety if a rider were to fall off of the vehicle during operation of the vehicle. A yet still further object is to provide a means for automatically causing the vehicle to hold a constant turn which actuates upon the occasion if a rider were to fall off of the vehicle during operation of the vehicle.

These and further objects of the present invention will become apparent to those skilled in the art to which this invention pertains and after a study of the present disclosure of the invention.

BRIEF DESCRIPTION OF THE SEVERAL VIEWS OF THE DRAWINGS

FIG. 1 shows a top, side and front plan view of the vehicle illustrating the body curvatures, the rider inclined riding surface/bed, and the like.

DETAILED DESCRIPTION OF THE INVENTION

Figure 1:
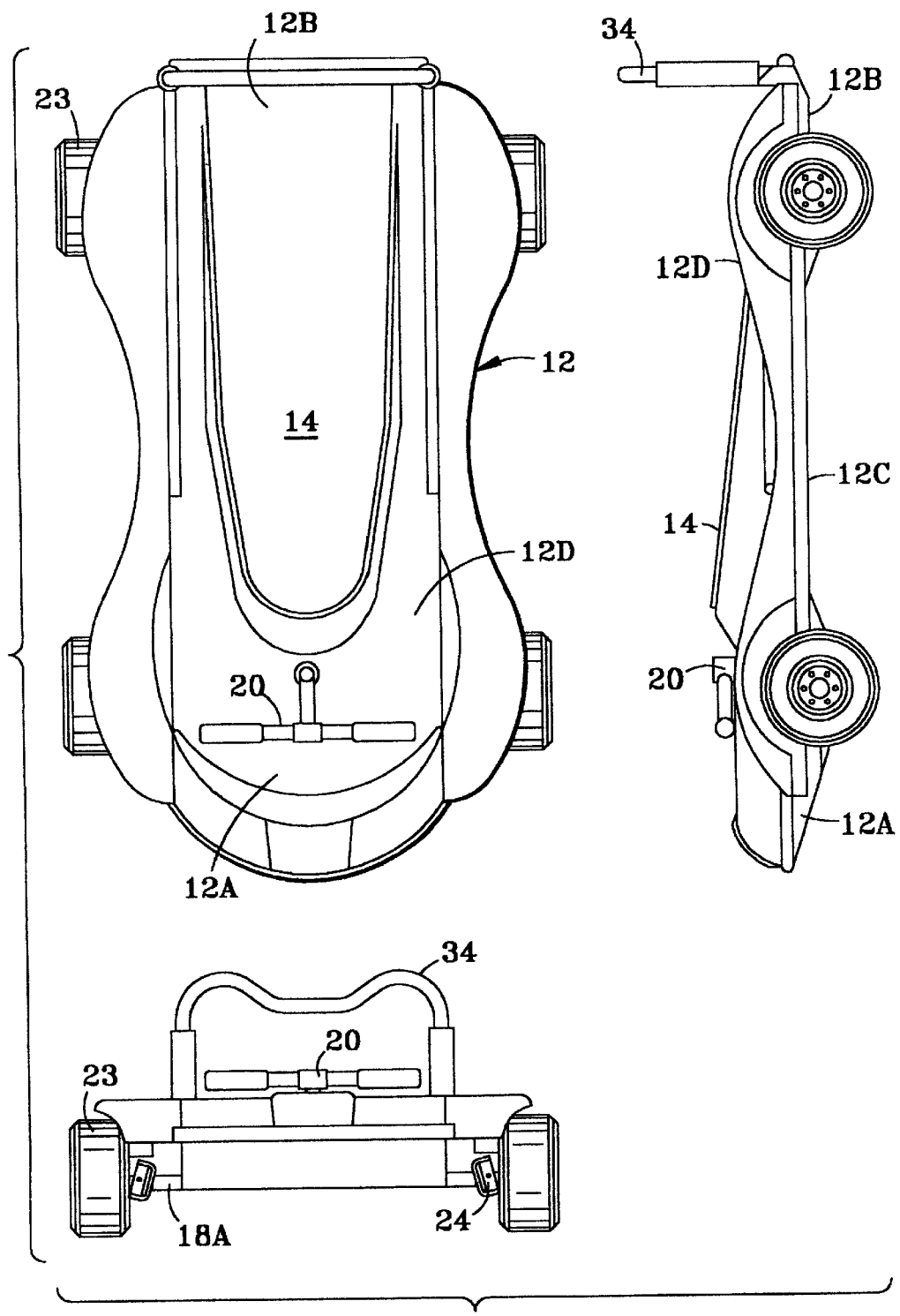

The following is a description of the preferred embodiment of the invention. It is clear that there may be variations in the size and the shape of the gravity driven wheeled vehicle, in the materials used in the construction and in the orientation of the components.

In order to most simply and clearly characterize the essential features of the invention, reference is made to drawing FIGS. 1, 1A, 1B, 2, 3, 6, and 10 in which the essential elements of the invention are identified by numerals (not in a circle). FIGS. 4, 5, 7, 8, and 9 are details of various elements which are well known to the ordinary skilled artisan. It is also important to note that the instant vehicle invention may have one wheel in front and one wheel in the rear. It is also possible to have three wheels with the single wheel either in the front or in the rear of the vehicle. Steering may be effected by using either the front wheel(s) or the rear wheel(s) or both. Braking combinations are likewise possible—front wheel, rear wheel or both.

With reference now to particularly FIGS. 1, 1A, 1B, 2, 3, 6, and 10 there is illustrated four-wheeled gravity-driven steerable wheeled vehicle 10. There is a chassis 12 having chassis front portion 12 A, chassis rear portion 12B, chassis underside 12C and chassis top side 12D. A rider-riding surface 14 is on chassis top side 12D and is configured to cause a rider on rider-riding surface 14 to be oriented in a prone, face down, face forward position. There is provided a means for attaching, 16, a rear axle assembly 16A substantially at chassis rear portion 12B. There is also means for mounting, 18, a front axle assembly 18A substantially at chassis front portion 12A.

Provided also is a means for steering, 20 gravity-driven steerable wheeled vehicle 10 or three-wheeled vehicle 40 by the rider when the rider is positioned on rider-riding surface 14. There are rear wheel hub and spindle assemblies 22 integral with rear axle assembly 16A. Wheels and tires 23 are normally mounted to the wheel hub. Front wheel hub and spindle assemblies 24 are integral with front axle assembly 18A.

A braking system or means for causing deceleration and halting of motion 26 of vehicle 10 when vehicle 10 (or 40) has motion is provided. Braking system 26 may be hydraulic, mechanical or a combination of the two and braking may be of all wheels or some of the wheels.

In order to help the rider stay on vehicle 10 or 40, there is a means for harnessing, 28, the rider onto and into rider-riding surface 14 when the rider is positioned on the vehicle. To provide additional comfort for the rider and to improve the stability of the vehicle while moving, there may be provided means for absorbing shock 30 exerted on each of the front wheels and tires 23 attached to each of the two front wheel hub and spindle assemblies 24 thereby damping shock caused by vehicle 10 passing over rough terrain, between front wheels and tires 23 and front axle assembly 18A. There may also be means for absorbing shock 32 exerted on each of the rear wheels and tires 23 attached to each of the two rear wheel hub and spindle assemblies 22 thereby further damping shock.

In order to get vehicle 10 or 40 up a ski slope for example, there is provided a combination rear roll-bar and transport bail 34. When the rider is on the vehicle, bar/bail 34 is in the lowered position providing the rider with a roll bar and an object against which pressure may be applied when the rider is in a sharp turn. Bar 34 is placed in a second position which permits attachment to a lift such as a ski lift.

In order to discuss some of the engineering features, reference is again made to the drawings including FIGS. 4, 5, 7, 8, and 9. The drawings show the preferred embodiments of the vehicle which have the following preferred specifications:

FIG. 1 shows a top, side, and front plan view of the vehicle illustrating the body curvatures, the rider-inclined riding surface/bed including the 11" diameter high speed pneumatic, tubeless tires in the preferred embodiment of the vehicle, which are designed for motor vehicle racing at speeds in excess of 100 mph and which provide excellent traction and a soft but firm ride.

Figure 3:
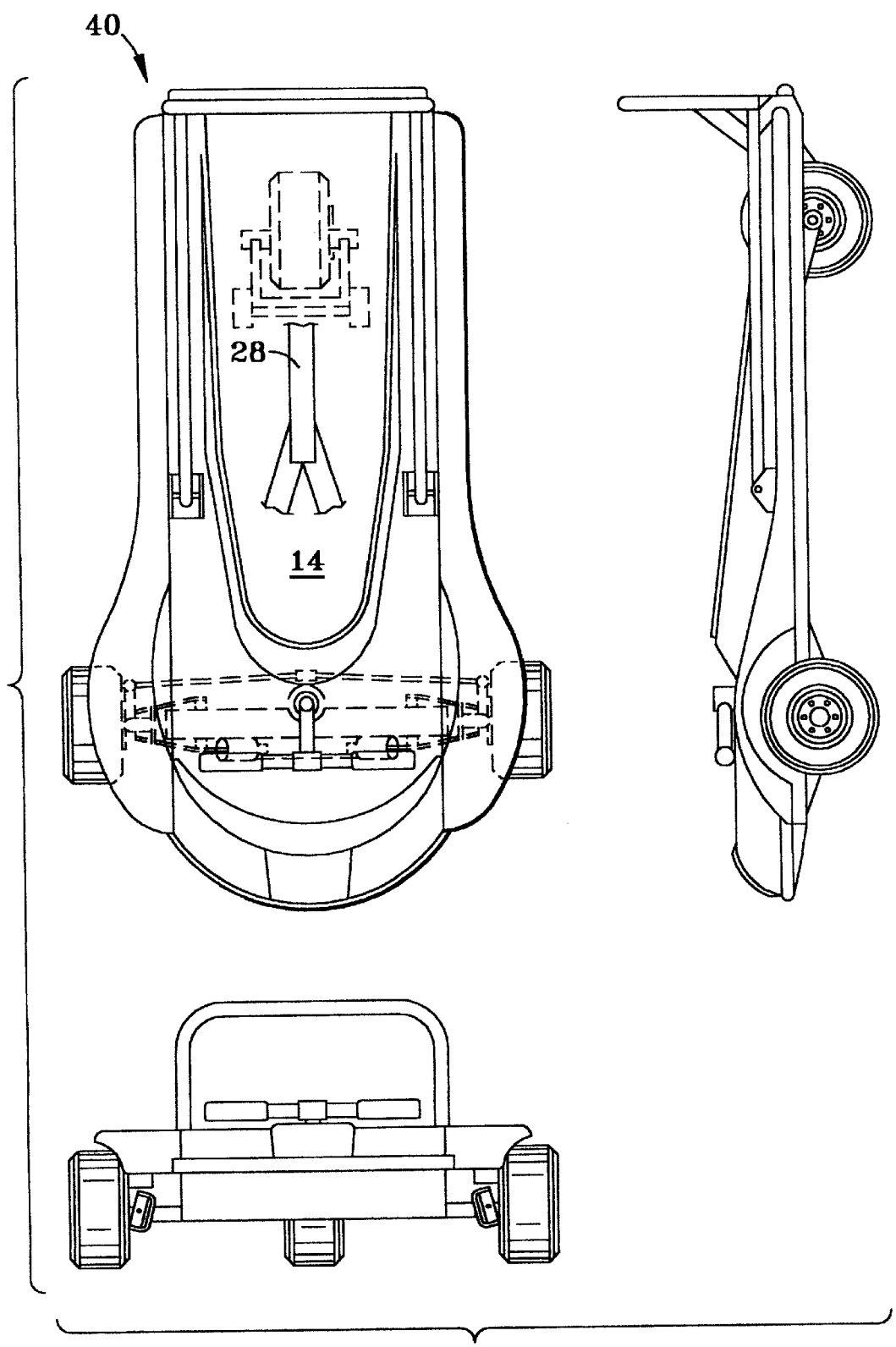
FIG. 3 illustrates a three-wheeled embodiment of the vehicle.
Figure 4:
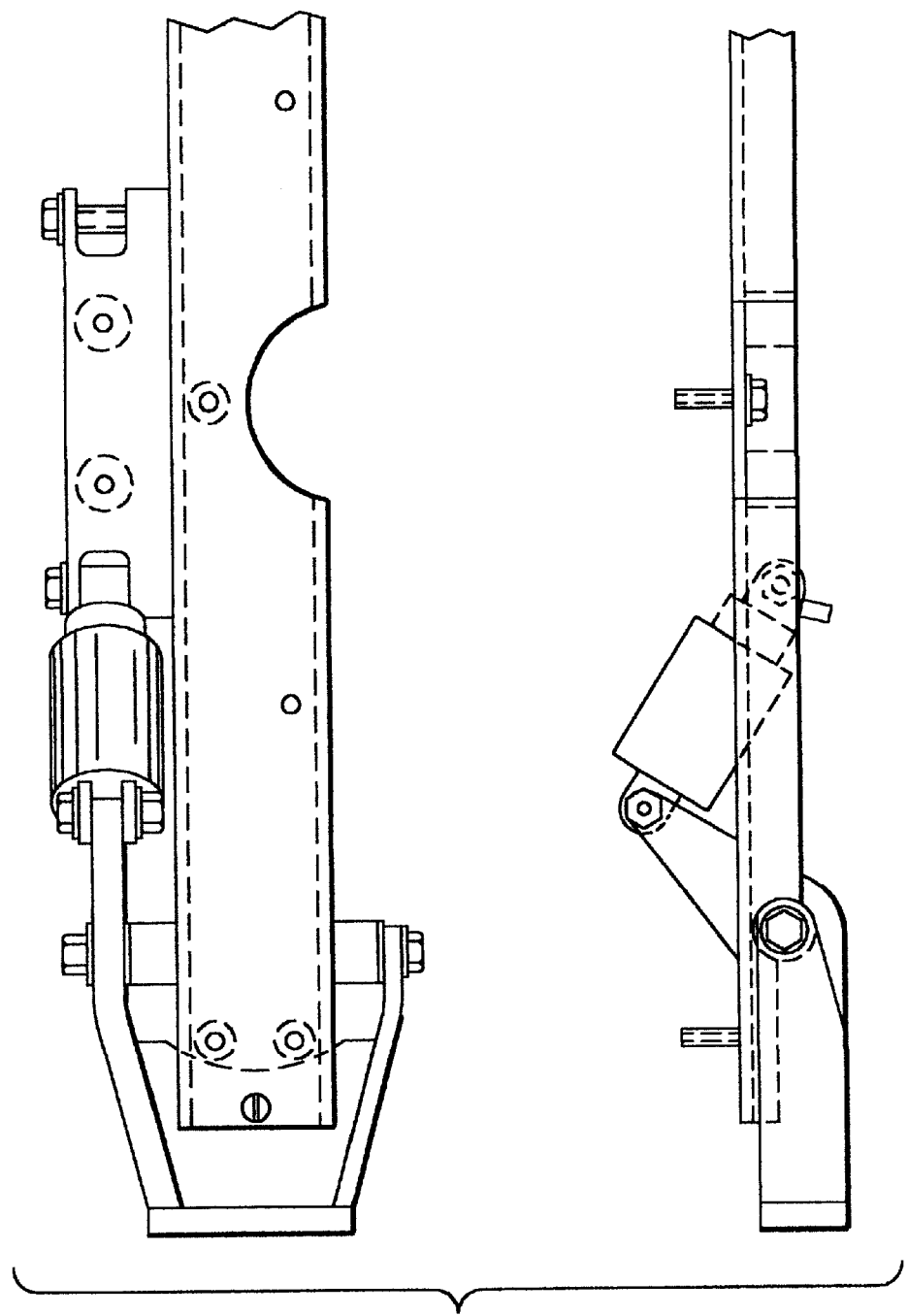
FIG. 4 is a detail view of the assembly axle with an air/oil shock used in the wheel suspension.
Figure 5:
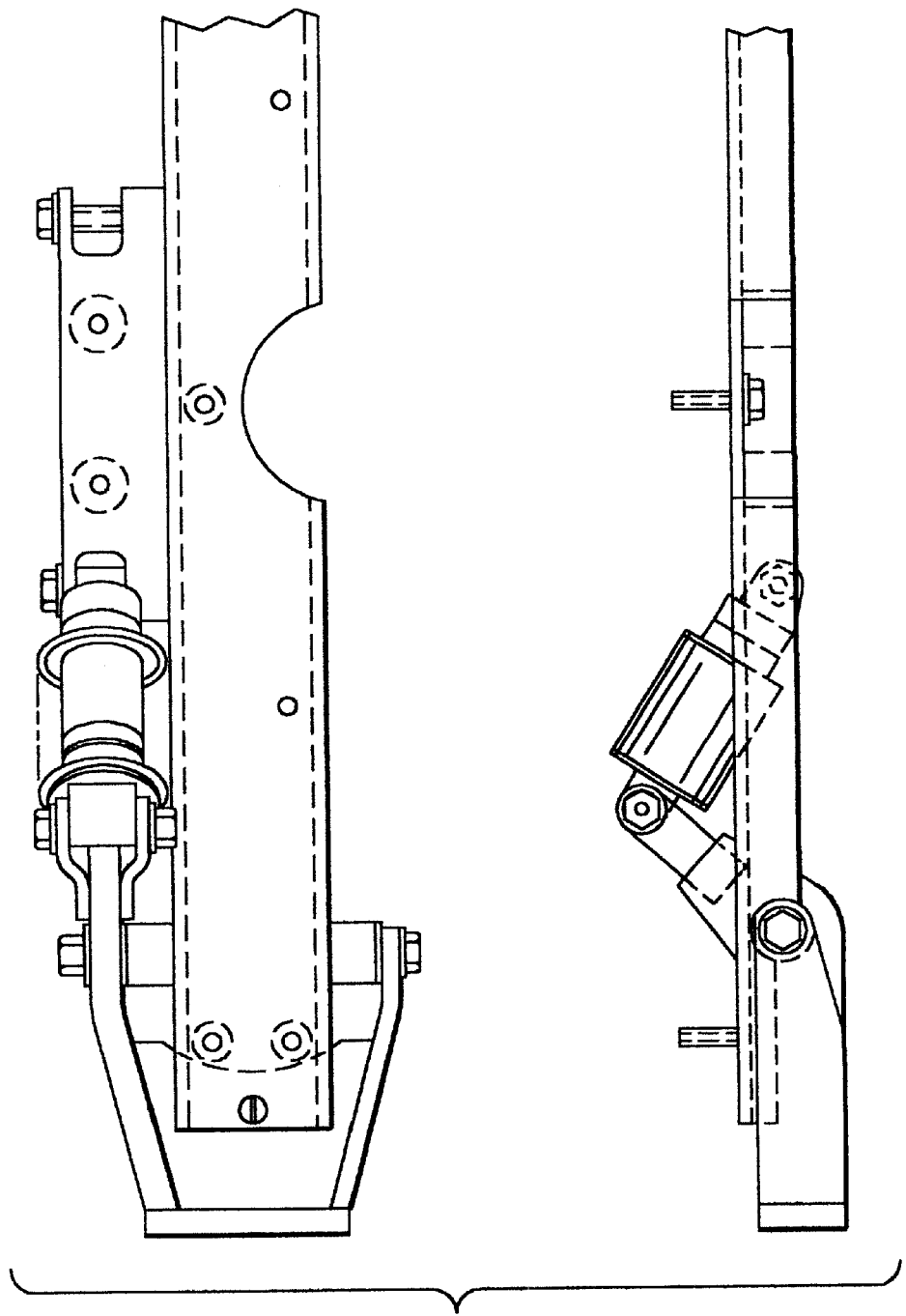
FIG. 5 is a detail view of the assembly axle with a coil/oil shock used in the wheel suspension.

Advanced four-wheel "A" arm air spring, oil damped suspension—independent four-wheel suspension with air/oil shocks or with coil/oil shocks is provided and yields a smooth, stable ride over surfaces with irregularities ranging from wash board to large bumps. However, not all four wheels need have suspension, possibly only the front wheels might have suspension. Also, the vehicle could be made in either a four-wheeled or three-wheeled embodiment. In either embodiment, the suspension is not essential. FIG. 3 illustrates a three-wheeled embodiment of the vehicle. FIG. 4 shows a detail view of the assembly axle with an air/oil shock used in the wheel suspension, and FIG. 5 shows a detail view of the assembly axle with a coil/oil shock used in the wheel suspension.

Figure 6:
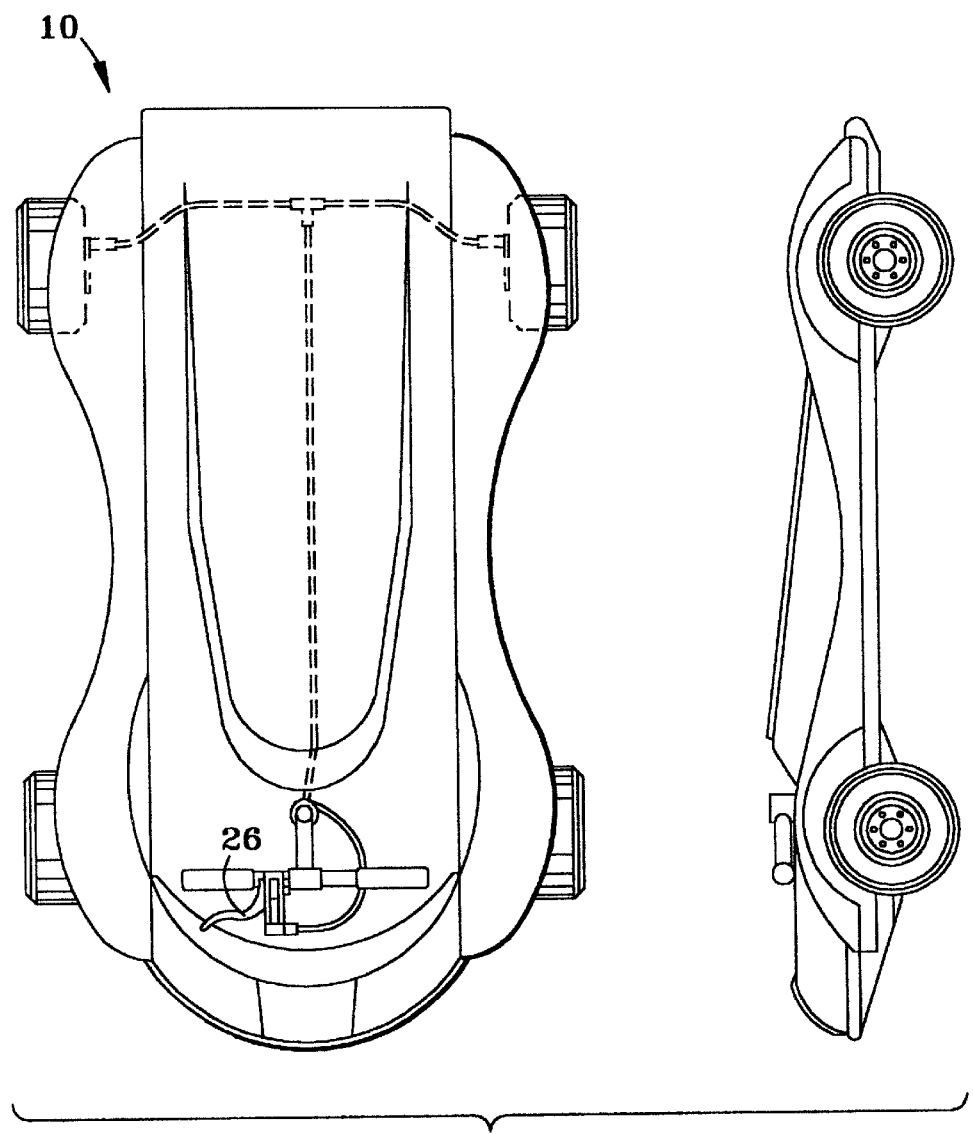
FIG. 6 is a detail view of the hydraulic rear wheel brake system.

Independent hydraulic braking is provided from dual, rear wheel, hydraulic disk brakes, designed for motor vehicle racing at speeds to 150 mph and operated with a single hand lever. These brakes give smooth, uniform and powerful braking capability whether with a four- or three-wheeled embodiment. The braking system could be modified for a three-wheeled embodiment. FIG. 6 is a detail view of the hydraulic rear wheel brake system.

Figure 10:
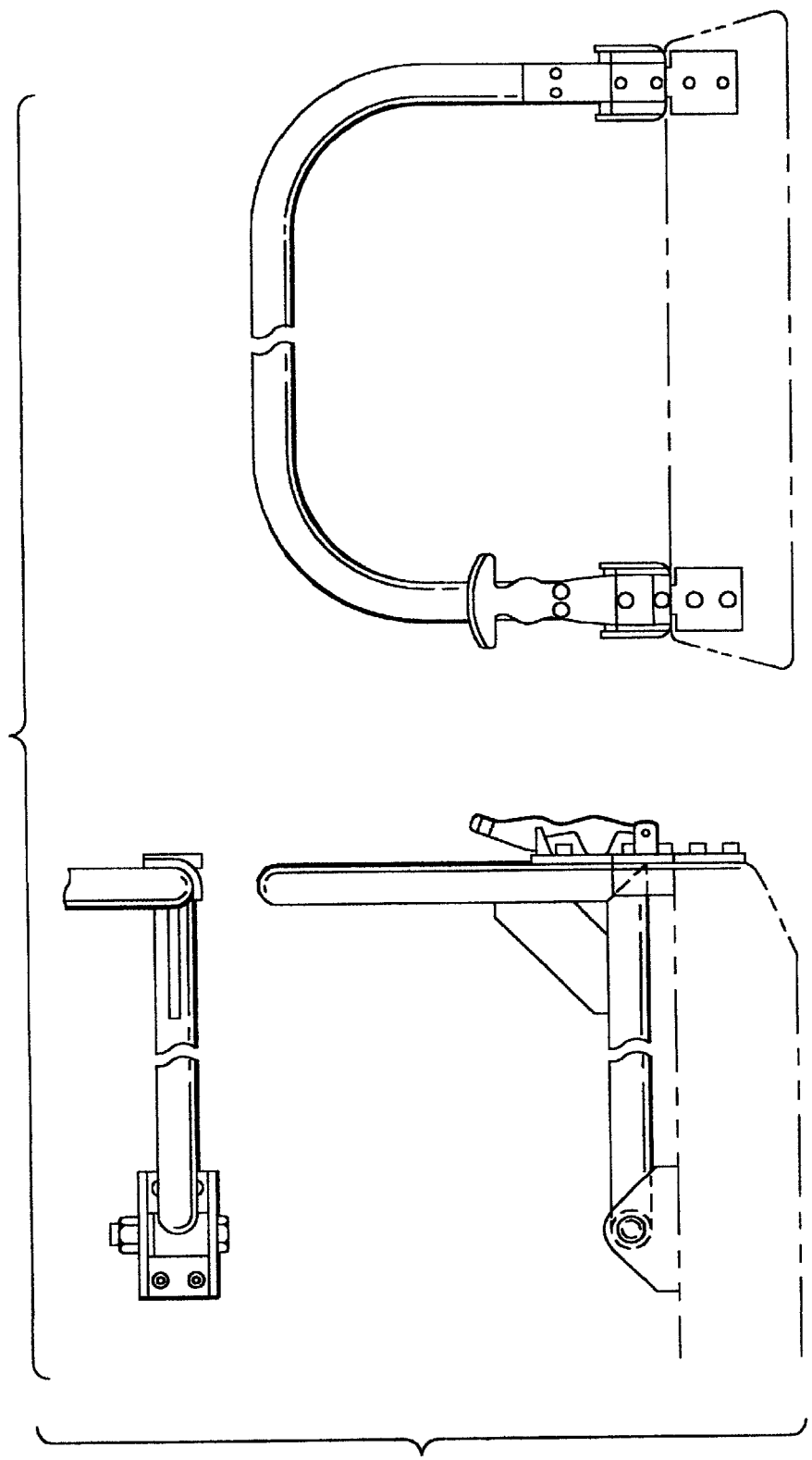
FIG. 10 illustrates detail of the tow-bar assembly which also is a part of the rider restraint system.

There is provided a combination rear roll-bar and transport bail. This bar is hinged so that locked in the folded down position, it tends to confine the legs of the rider and further resists overturning of the vehicle. When this bar is in the unfolded or up position it is useful as a tow or lift bar which may be attachable to a ski lift as an example of use. However, it is possible to have an embodiment of the vehicle without this feature. FIG. 10 illustrates detail of the tow-bar assembly which also is a part of the rider restraint system.

The prone (lying down) low center of gravity design provides control and good visibility. It is also possible that this low position may add to the level of safety for the rider. The extremely low center of gravity provides a relatively stable and safe ride—overturning is nearly impossible.

Figure 2:
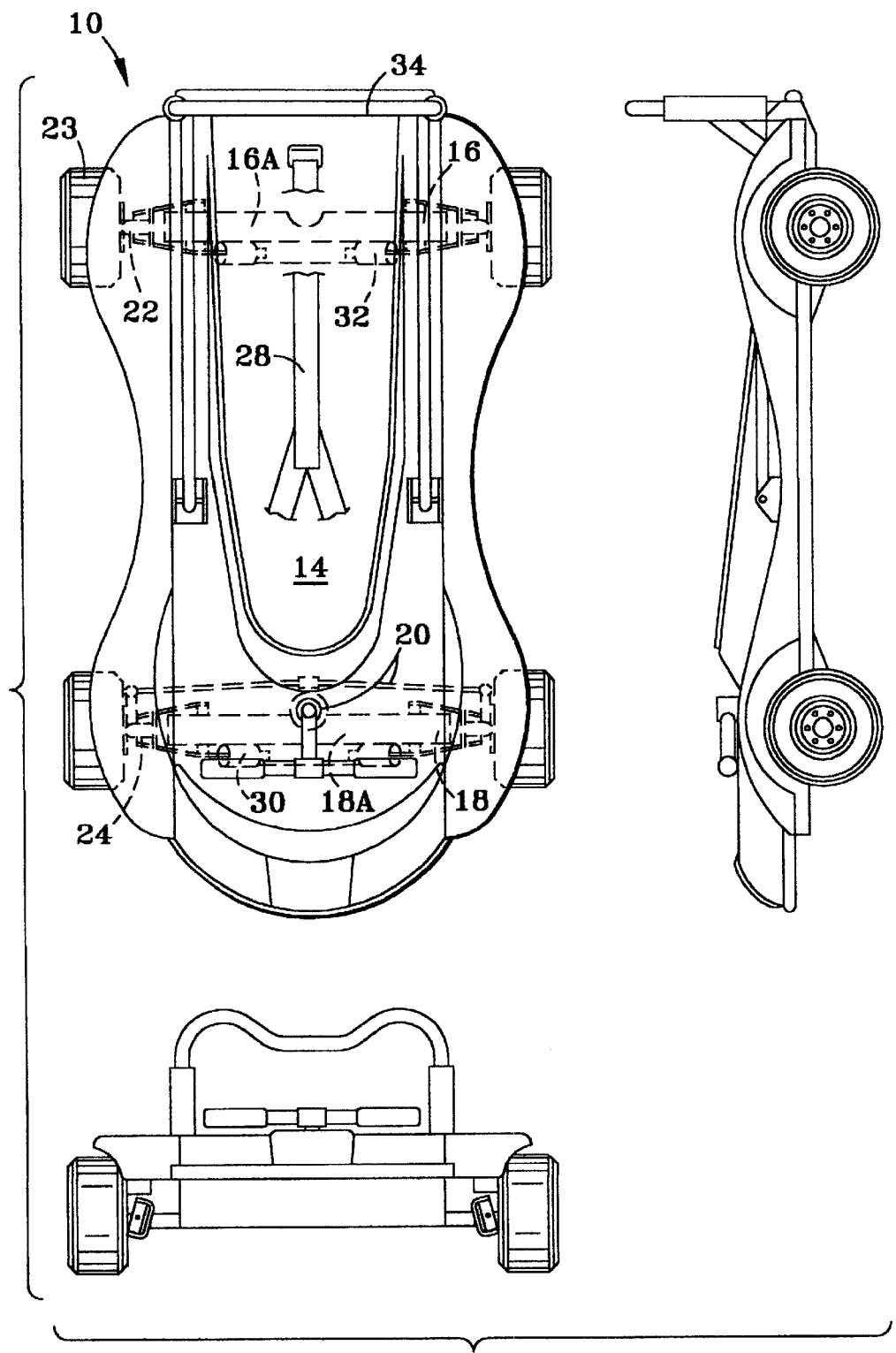
FIG. 2 shows a top, side, and front plan view of the vehicle showing, in shadow, the axle, steering, and wheel spindles.

There is provided a safety harness which enhances control, stability, and rider safety, and which is shown illustrated in FIGS. 2 and 3. The shoulder harness provides rider stability and contributes to rider safety by keeping the rider in place on the vehicle.

There is also an automatic brake which actuates upon release of the hand grips for operation and parking safety. This feature is not essential to the basic embodiment of the invention, however this is an important additional feature. With this safety braking mechanism, the vehicle will be stopped if the rider were to fall off of the vehicle at some point during the operation of the vehicle. Additional to the automatic brake system there may also be a means for causing the vehicle to go into a constant tight turn mode of operation if the rider loses control or if the rider falls from the vehicle while in motion.

The surface of the vehicle on which the rider lays is comprised of a closed cell body pad for rider comfort. There is an elevated chest rest and thick foam mat which provide additional rider comfort and visibility.

In the preferred embodiment, the body and chassis of the vehicle is made from light-weight foam core fiberglass-reinforced construction. The strong, rigid, impact-resistant, foam-filled fiberglass body with aluminum inserts provides a single framework for attachment of all components. Fiberglass body, plated steel parts, and extensive use of aluminum provide optimum protection from the elements, and from impact damage.

Figure 7:
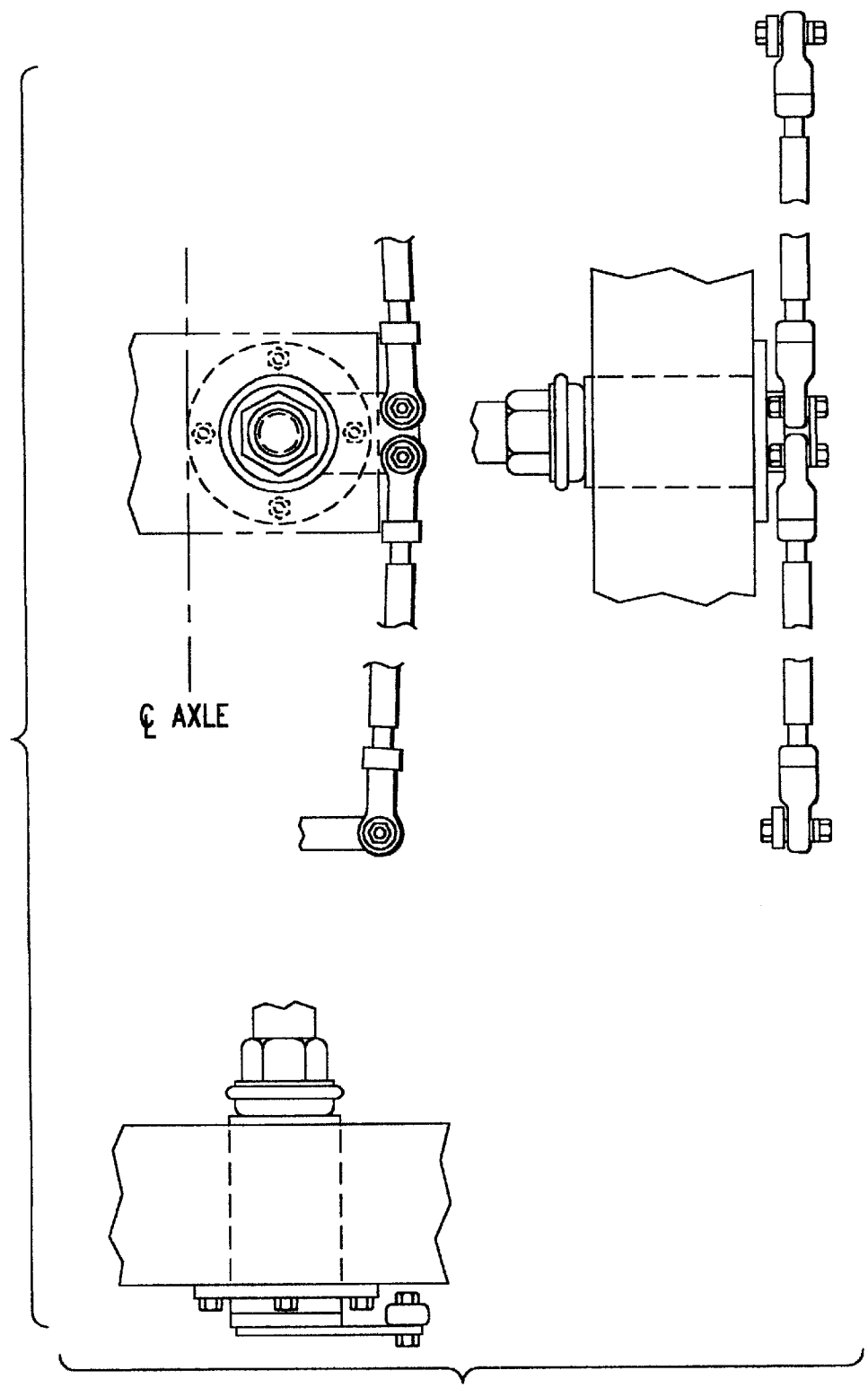
FIG. 7 is a detail view showing the steering linkage in association with the prone steering position of the rider.

The steering and braking mechanism is a ball bearing bicycle style steering and braking assembly which is positive, responsive and familiar to all to control, thus making learning to ride, and riding the vehicle easier and more comfortable. FIG. 7 is a detail view showing the prone steering linkage.

There are provided precision bearings on all four axles in one embodiment. Independent rear axles provide maximum maneuverability in a four-wheeled embodiment.

The vehicle may be provided with precision wheel hubs with pre-lubricated ball bearings, which are maintenance free.

Figure 8:
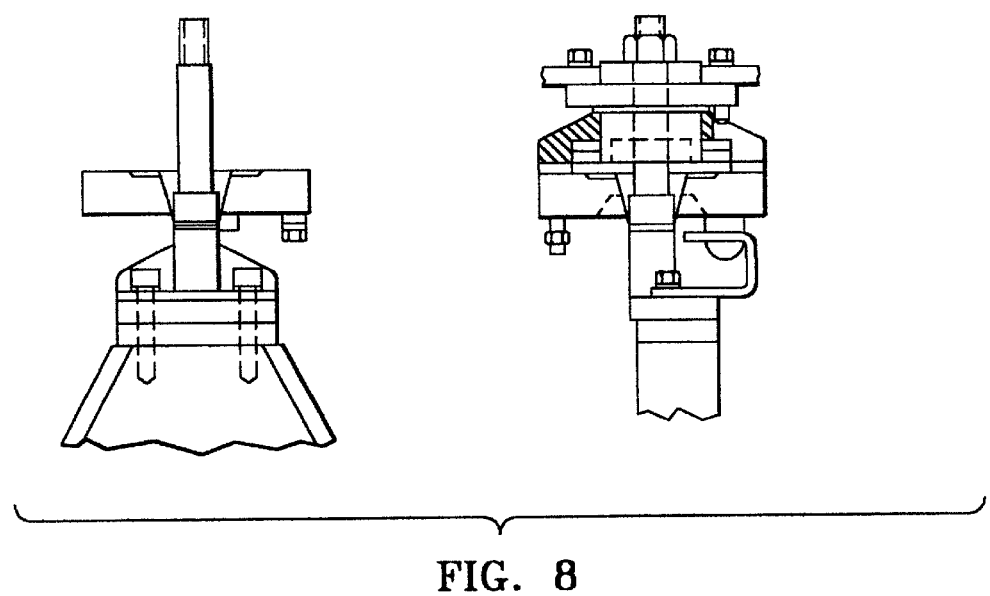
FIG. 8 is a detail view showing the right rear wheel spindle.
Figure 9:
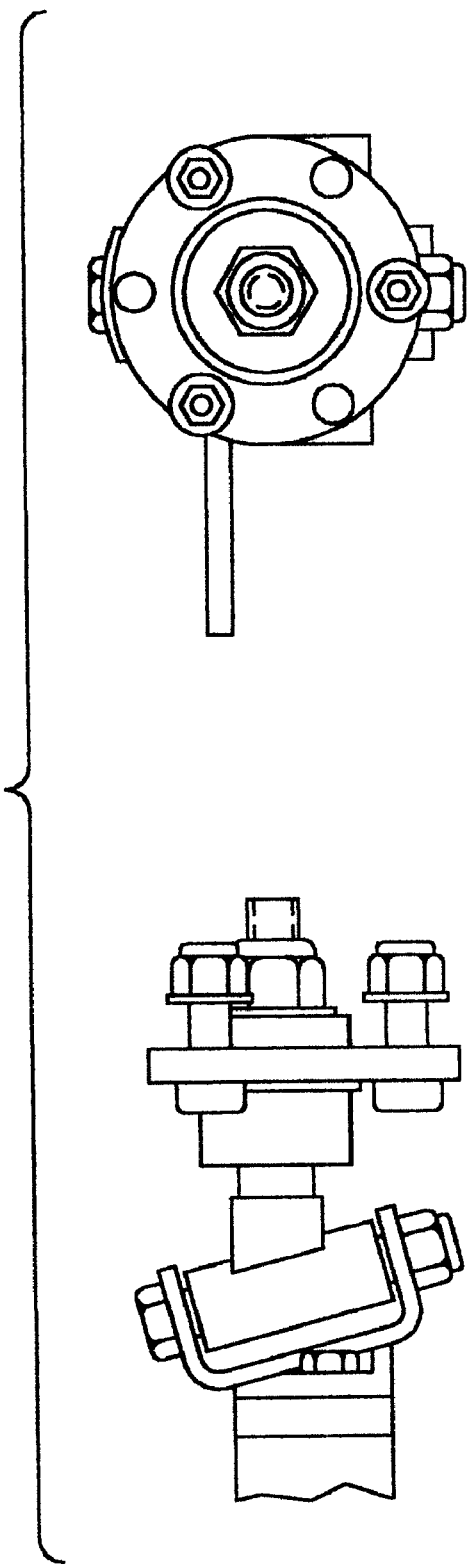
FIG. 9 is a detail view showing the right front wheel spindle.

In a preferred embodiment the suspension and steering spindle bearings are formed of woven TEFLON™—films or sheets made from polymers of fluorinated hydrocarbons for use in packaging applications, in electrical and non-electrical insulation, as protective liners for containers and equipment, in tapes, in machinery parts, incovering, coating, and packing substances, in hose and piping, and for general use in the industrial arts—or NOMEX™—spunlaced fabrics for industrial and apparel use—and are designed to withstand high impact forces and hostile environments, and provide long life with no maintenance. FIG. 2 shows a top, side, and front plan view of the vehicle showing, in shadow, the axle, steering, and wheel spindles. Also, FIGS. 8 and 9 show a detail view showing the right rear wheel spindle and a detail view showing the right front wheel spindle.

The preferred steering post ball bearings and linkage ball rod ends provide maintenance free, smooth, zero backlash response.

In the preferred embodiments, each vehicle may be provided with elastomer bumper strips in the front and the rear which provide impact protection for the vehicle and rider.

The preferred steering post, wheel, and front and rear axle assemblies can be removed intact should maintenance be required, thus reducing time and cost of any necessary maintenance.

In a preferred embodiment, the vehicle chassis has a ramp-shaped underbody and detachable covers which offer protection for axles, steering linkage, and suspension from road obstacles.

Each vehicle in the preferred embodiments has strong, impact resistant fiberglass fenders which protect the rider from track dirt and contact with the wheels when riding.

The preferred size of the vehicle is as follows: the weight is approximately 100 pounds; the length is about 70 inches; the width is about 40 inches; the track is about 35 inches; the wheel base is about 43 inches; and the height to the top of the crown is about 13⅝ inches, and to the top of roll bar, about 20⅝ inches.

It is thought that the present gravity driven steerable wheeled vehicle, for use in riding or racing primarily down hill over varied terrain, and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof

What is claimed is:

1. A gravity driven steerable wheeled vehicle comprising:
   a chassis having a front portion, a rear portion, an underside and a top side;
   a rider riding surface on said chassis top side configured to cause a rider on said rider riding surface to be oriented in a prone, face down, face forward position;
   means for attaching a rear axle assembly substantially at said chassis rear portion;
   means for mounting a front axle assembly substantially at said chassis front portion;
   means for steering said gravity driven steerable wheeled vehicle by said rider when said rider is positioned on said rider riding surface;
   at least one but not more than two rear wheel hub and spindle assemblies integral with said rear axle assembly; and
   at least one but not more than two front wheel hub and spindle assemblies integral with said front axle assembly.

2. The gravity driven steerable wheeled vehicle according to claim 1 further comprising means for causing deceleration and halting of motion of said vehicle when said vehicle has motion.

3. The gravity driven steerable wheeled vehicle according to claim 1 further comprising means for harnessing the rider onto and into said rider riding surface when said rider is positioned on said vehicle.

4. The gravity driven steerable wheeled vehicle according to claim 1 further comprising
   at least one but not more than two front wheels;
   at least one but not more than two front tires mounted on said at least one but not more than two front wheels forming at least one but not more than two front wheel/tire combinations, each said at least one but not more than two front wheel/tire combinations attached to each said at least one but not more than two front wheel hub and spindle assemblies; and
   means for absorbing shock exerted on at least one but not more than two front wheel/tire combinations, thereby damping shock, caused by said vehicle passing over rough terrain, between at least one but not more than two front wheel/tire combinations and said front axle assembly.

5. The gravity driven steerable wheeled vehicle according to claim 1 wherein said means for steering said gravity driven steerable wheeled vehicle comprises a steering system for steering said front axle assembly.

6. The gravity driven steerable wheeled vehicle according to claim 1 wherein said means for steering said gravity driven steerable wheeled vehicle comprises a steering system for steering said rear axle assembly.

7. The gravity driven steerable wheeled vehicle according to claim 2 further comprising means for harnessing the rider onto and into said rider riding surface when said rider is positioned on said vehicle.

8. The gravity driven steerable wheeled vehicle according to claim 7 further comprising
   at least one but not more than two front wheels;
   at least one but not more than two front tires mounted on said at least one but not more than two front wheels forming at least one but not more than two front wheel/tire combinations, each said at least one but not more than two front wheel/tire combinations attached to each said at least one but not more than two front wheel hub and spindle assemblies; and
   means for absorbing shock exerted on at least one but not more than two front wheel/tire combinations, thereby damping shock, caused by said vehicle passing over rough terrain, between at least one but not more than two front wheel/tire combinations and said front axle assembly.

9. The gravity driven steerable wheeled vehicle according to claim 8 further comprising
   at least one but not more than two rear wheels;
   at least one but not more than two rear tires mounted on said at least one but not more than two rear wheels forming at least one but not more than two rear wheel/tire combinations, each said at least one but not more than two rear wheel/tire combinations attached to each said at least one but not more than two rear wheel hub and spindle assemblies; and
   means for absorbing shock exerted on at least one but not more than two rear wheel/tire combinations, thereby damping shock, caused by said vehicle passing over rough terrain, between at least one but not more than two rear wheel/tire combinations and said rear axle assembly.

10. The gravity driven steerable wheeled vehicle according to claim 3 further comprising
    at least one but not more than two front wheels;
    at least one but not more than two front tires mounted on said at least one but not more than two front wheels forming at least one but not more than two front wheel/tire combinations, each said at least one but not more than two front wheeltire combinations attached to each said at least one but not more than two front wheel hub and spindle assemblies; and
    means for absorbing shock exerted on at least one but not more than two front wheel/tire combinations, thereby damping shock, caused by said vehicle passing over rough terrain, between at least one but not more than two front wheel/tire combinations and said front axle assembly.

11. The gravity driven steerable wheeled vehicle according to claim 10 further comprising
    at least one but not more than two rear wheels;
    at least one but not more than two rear tires mounted on said at least one but not more than two rear wheels forming at least one but not more than two rear wheel/ tire combinations, each said at least one but not more than two rear wheel/tire combinations attached to each said at least one but not more than two rear wheel hub and spindle assemblies; and means for absorbing shock exerted on at least one but not more than two rear wheel/tire combinations, thereby damping shock, caused by said vehicle passing over rough terrain, between at least one but not more than two rear wheel/tire combinations and said rear axle assembly.

12. The gravity driven steerable wheeled vehicle according to claim 4 further comprising at least one but not more than two rear wheels;

least one but not more than two rear tires mounted on said at least one but not more than two rear wheels forming at least one but not more than two rear wheel/tire combinations, each said at least one but not more than two rear wheel/tire combinations attached to each said at least one but not more than two rear wheel hub and spindle assemblies; and means for absorbing shock exerted on at least one but not more than two rear wheel/tire combinations, thereby damping shock, caused by said vehicle passing over rough terrain, between at least one but not more than two rear wheel/tire combinations and said rear axle assembly.

13. The gravity driven steerable wheeled vehicle according to claim 9 wherein said means for steering said gravity driven steerable wheeled vehicle comprises a steering system for steering said front axle assembly.

14. The gravity driven steerable wheeled vehicle according to claim 9 wherein said means for steering said gravity driven steerable wheeled vehicle comprises a steering system for steering said rear axle assembly.

15. The gravity driven steerable wheeled vehicle according to claim 5 wherein said means for steering said gravity driven steerable wheeled vehicle further comprises a steering system for steering said rear axle assembly.

16. The gravity driven steerable wheeled vehicle according to claim 5 wherein said means for causing deceleration and halting of motion of said vehicle is at least one hydraulic brake mechanism braking at least one of said at least one but not more than two front wheel hub and spindle assemblies.

17. The gravity driven steerable wheeled vehicle according to claim 13 wherein said means for steering said gravity driven steerable wheeled vehicle comprises a steering system for steering said rear axle assembly.

18. The gravity driven steerable wheeled vehicle according to claim 17 wherein said means for causing deceleration and halting of motion of said vehicle is at least one hydraulic brake mechanism braking at least one of said at least one but not more than two front wheel hub and spindle assemblies.

19. A gravity driven steerable wheeled vehicle comprising:

a chassis having a front portion, a rear portion, an underside and a top side;

a rider riding surface on said chassis top side configured to cause a rider on said rider riding surface to be oriented in a prone, face down, face forward position;

means for attaching a rear axle assembly substantially at said chassis rear portion;

means for mounting a front axle assembly substantially at said chassis front portion;

means for steering said gravity driven steerable wheeled vehicle by said rider when said rider is positioned on said rider riding surface;

two rear wheel hub and spindle assemblies integral with said rear axle assembly, one said rear wheel hub and spindle assembly at each end of said rear axle assembly; and two front wheel hub and spindle assemblies integral with said front axle assembly, one said front wheel hub and spindle assembly at each end of said front axle assembly.

20. The gravity driven steerable wheeled vehicle according to claim 19 further comprising means for causing deceleration and halting of motion of said vehicle when said vehicle has motion.

21. The gravity driven steerable wheeled vehicle according to claim 19 further comprising means for harnessing the rider onto and into said rider riding surface when said rider is positioned on said vehicle.

22. The gravity driven steerable wheeled vehicle according to claim 19 further comprising two front wheels;

two front tires, each of said two front tires mounted on each of said two front wheels forming two front tire/wheel combinations, each of said front tire/wheel combinations attached to each of said two front wheel hub and spindle assemblies; and means for absorbing shock exerted on each said front tire/wheel combinations thereby damping shock, caused by said vehicle passing over rough terrain, between said front tire/wheel combinations and said front axle assembly.

23. The gravity driven steerable wheeled vehicle according to claim 20 further comprising means for harnessing the rider onto and into said rider riding surface when said rider is positioned on said vehicle.

24. The gravity driven steerable wheeled vehicle according to claim 21 further comprising two front wheels;

two front tires, each of said two front tires mounted on each of said two front wheels forming two front tire/wheel combinations, each of said front tire/wheel combinations attached to each of said two front wheel hub and spindle assemblies; and means for absorbing shock exerted on each said front tire/wheel combinations thereby damping shock, caused by said vehicle passing over rough terrain, between said front tire/wheel combinations and said front axle assembly.

25. The gravity driven steerable wheeled vehicle according to claim 23 further comprising two front wheels;

two front tires, each of said two front tires mounted on each of said two front wheels forming two front tire/wheel combinations, each of said front tire/wheel combinations attached to each of said two front wheel hub and spindle assemblies; and means for absorbing shock exerted on each said front tire/wheel combinations thereby damping shock, caused by said vehicle passing over rough terrain, between said front tire/wheel combinations and said front axle assembly.

26. The gravity driven steerable wheeled vehicle according to claim 25 further comprising two rear wheels;

two rear tires, each of said two rear tires mounted on each of said two rear wheels forming two rear tire/wheel combinations, each of said rear tire/wheel combinations attached to each of said two rear wheel hub and spindle assemblies; and means for absorbing shock exerted on each said rear tire/wheel combinations thereby damping shock, caused by said vehicle passing over rough terrain, between said rear tire/wheel combinations and said rear axle assembly.

27. A gravity driven steerable wheeled vehicle comprising:

a chassis having a front portion, a rear portion, an underside and a top side;

a rider riding surface on said chassis top side configured to cause a rider on said rider riding surface to be oriented in a prone, face down, face forward position;

means for attaching a rear axle assembly substantially at said chassis rear portion;

means for mounting a steerable front axle assembly substantially at said chassis front portion;

means for steering said gravity driven steerable wheeled vehicle by said rider when said rider is positioned on said rider riding surface;

two rear wheel hub and spindle assemblies integral with said rear axle assembly, one said rear wheel hub and spindle assembly at each end of said rear axle assembly;

two front wheel hub and spindle assemblies integral with said front axle assembly, one said front wheel hub and spindle assembly at each end of said front axle assembly;

two front wheels and two front tires, each said front tire mounted on each of said two front wheels forming two front tire/wheel combinations, each said front tire/wheel combination attached to each said two front wheel hub and spindle assemblies;

two rear wheels and two rear tires, each said rear tire mounted on each of said two rear wheels forming two rear tire/wheel combinations, each said rear tire/wheel combination attached to each said two rear wheel hub and spindle assemblies;

means for absorbing shock exerted on each said front tire/wheel combinations thereby damping shock caused by said vehicle passing over rough terrain, between said front tire/wheel combinations and said front axle assembly;

means for absorbing shock exerted on each said rear tire/wheel combinations thereby damping shock caused by said vehicle passing over rough terrain, between said rear tire/wheel combinations and said rear axassembly; and means for causing deceleration and halting of motion of said vehicle when said vehicle has motion; and means for harnessing the rider onto and into said rider riding surface when said rider is positioned on said vehicle.

* * * * *